(12) United States Patent
Horning

(10) Patent No.: US 7,712,752 B2
(45) Date of Patent: May 11, 2010

(54) SPORTS EQUIPMENT STORAGE DEVICE

(76) Inventor: Jack Horning, 114 Arlayne Road, S9C, C28, RR#1, Kaleden, British Columbia (CA) V0H 1K0

( * ) Notice: Subject to any disclaimer, the term of this patent is extended or adjusted under 35 U.S.C. 154(b) by 330 days.

(21) Appl. No.: 11/785,133

(22) Filed: Apr. 16, 2007

(65) Prior Publication Data
US 2007/0278755 A1  Dec. 6, 2007

Related U.S. Application Data

(63) Continuation-in-part of application No. 10/936,595, filed on Sep. 9, 2004, now abandoned.

(60) Provisional application No. 60/501,076, filed on Sep. 9, 2003.

(51) Int. Cl.
*B62B 1/00* (2006.01)

(52) U.S. Cl. .................. 280/47.19; 280/47.26; 280/652

(58) Field of Classification Search .............. 280/47.26, 280/47.19, 638.8, 35, 659, 47.17, 47.18, 280/79.2, 47.24, 47.29, 47.35, 655.1, 47.21
See application file for complete search history.

(56) References Cited

U.S. PATENT DOCUMENTS

| | | | |
|---|---|---|---|
| 3,010,775 A | 11/1961 | Giovananelli |
| 3,869,137 A | 3/1975 | Byrom |
| 3,876,223 A | 4/1975 | O'Reilly et al. |
| 4,193,495 A | 3/1980 | Keeley |
| 4,217,073 A | 8/1980 | Propst |
| 4,227,710 A | 10/1980 | Laub |
| 4,254,850 A | 3/1981 | Knowles |
| 4,313,612 A | 2/1982 | Rubens |
| 4,314,624 A | 2/1982 | Royet |
| D263,690 S | 4/1982 | Laub |
| 4,418,930 A | 12/1983 | Ryan, Jr. |
| 4,575,109 A | 3/1986 | Cowdery |
| 4,629,065 A | 12/1986 | Braaten |
| 4,792,025 A | 12/1988 | Thomas |
| 4,793,532 A | 12/1988 | Cash |
| 4,846,493 A | 7/1989 | Mason |
| 4,848,782 A | 7/1989 | Schmidt |

(Continued)

FOREIGN PATENT DOCUMENTS

CA 2014206 10/1991

(Continued)

*Primary Examiner*—Glenn Dayoan
*Assistant Examiner*—Bridget Avery
(74) *Attorney, Agent, or Firm*—Antony C. Edwards

(57) ABSTRACT

A storage device for transporting equipment includes a housing having a base end, a pair of retractable wheels, and a foot operated actuator for retracting and extending the wheels from the housing. The housing defines at least one compartment for storing the equipment. The housing has a handle at an upper end thereof, an open front defining an opening into the housing, and a door for selectively closing the open front. The actuator is coupled to a lower end of the housing towards its base end. Actuation of the actuator displaces the wheels between retracted and extended positions while the housing is resting on its base end. A user while grasping the handle depresses a foot pedal component of the actuator to extend the wheels against the resiliently biased return force of a spring. A manually operated latch releases the wheels to their retracted position urged by the spring.

1 Claim, 8 Drawing Sheets

U.S. PATENT DOCUMENTS

| | | | |
|---|---|---|---|
| 4,922,574 A * | 5/1990 | Heiligenthal et al. | 16/35 R |
| 4,936,467 A | 6/1990 | Bobeczko | |
| 4,968,048 A | 11/1990 | Lortie | |
| 5,054,625 A | 10/1991 | Foley | |
| 5,100,198 A | 3/1992 | Baltzell | |
| 5,114,164 A | 5/1992 | Bothwell et al. | |
| 5,224,602 A | 7/1993 | Bettles et al. | |
| 5,228,706 A | 7/1993 | Boville | |
| D338,306 S | 8/1993 | White et al. | |
| D340,565 S | 10/1993 | Klopfenstein | |
| 5,249,438 A | 10/1993 | Rhaney et al. | |
| 5,273,298 A | 12/1993 | Brown, Sr. | |
| 5,303,805 A | 4/1994 | Hauser | |
| 5,351,976 A | 10/1994 | Penson | |
| 5,373,708 A | 12/1994 | Dumoulin, Jr. | |
| 5,599,037 A | 2/1997 | Spickler | |
| 5,626,244 A | 5/1997 | Mesna et al. | |
| 5,667,082 A | 9/1997 | Hamilton et al. | |
| 5,690,235 A | 11/1997 | Matzen | |
| 5,702,140 A | 12/1997 | Radja | |
| 5,797,612 A | 8/1998 | Buccioni | |
| D401,727 S | 11/1998 | Weideman et al. | |
| 5,868,247 A | 2/1999 | Schrader | |
| 5,899,467 A | 5/1999 | Henkel | |
| 5,975,293 A | 11/1999 | Fowler | |
| 5,988,657 A | 11/1999 | Henkel | |
| 6,029,830 A | 2/2000 | Manookian | |
| 6,053,340 A | 4/2000 | Cameron | |
| 6,056,301 A | 5/2000 | Berliner et al. | |
| 6,142,544 A | 11/2000 | Benzoni et al. | |
| 6,164,672 A | 12/2000 | Hansen | |
| 6,168,016 B1 | 1/2001 | Lawson | |
| 6,186,522 B1 | 2/2001 | Weis | |
| 6,237,583 B1 | 5/2001 | Ripley et al. | |
| 6,330,944 B1 | 12/2001 | DeMichele | |
| 6,367,602 B1 | 4/2002 | Chang | |
| 6,442,018 B1 | 8/2002 | Dinkin | |
| 6,494,468 B1 | 12/2002 | Inge | |
| 6,520,514 B2 | 2/2003 | Clegg | |
| 6,715,774 B2 | 4/2004 | Cassoni | |
| 2002/0057552 A1 | 5/2002 | Dinkin | |
| 2002/0063072 A1 | 5/2002 | Pham | |
| 2002/0096844 A1 | 7/2002 | Clegg | |
| 2002/0101065 A1 | 8/2002 | McCollum et al. | |
| 2003/0042695 A1 | 3/2003 | White | |
| 2003/0042696 A1 | 3/2003 | White | |
| 2004/0026882 A1 | 2/2004 | Brown | |

FOREIGN PATENT DOCUMENTS

| | | |
|---|---|---|
| CA | 1295351 | 2/1992 |
| JP | 1062177 | 3/1989 |

* cited by examiner

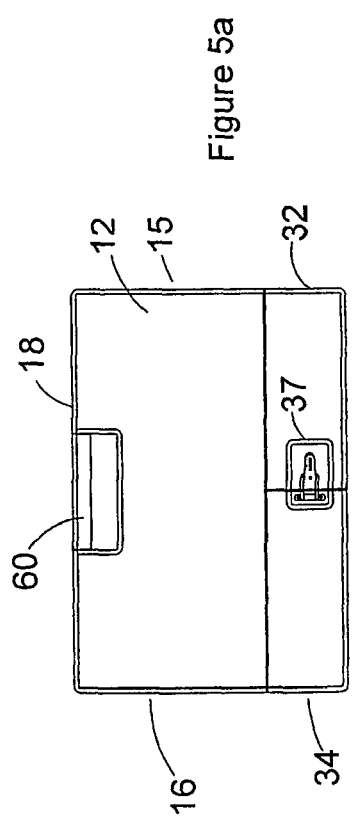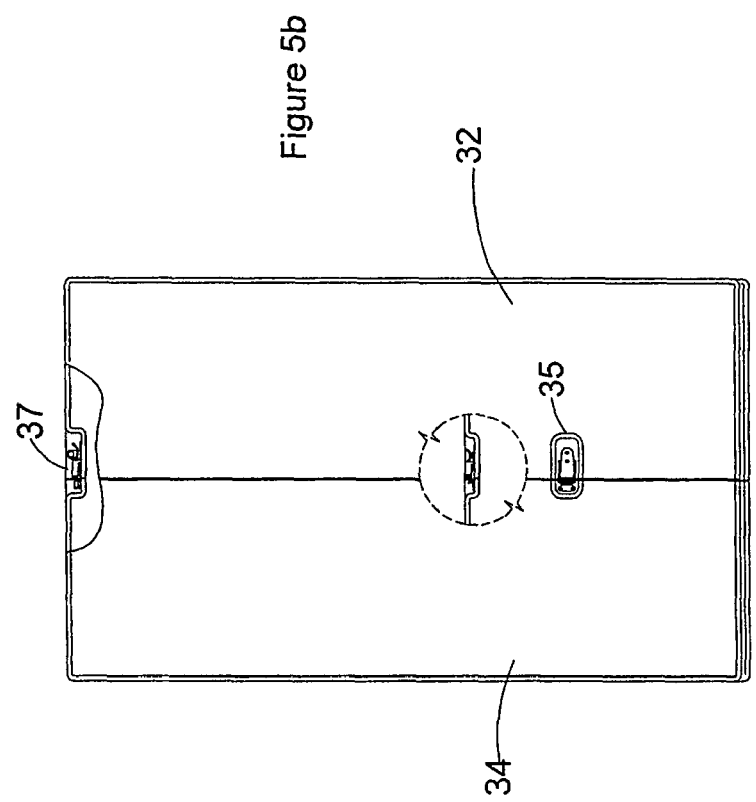

SPORTS EQUIPMENT STORAGE DEVICE

CROSS REFERENCE TO RELATED APPLICATION

This application is a Continuation-in-Part of U.S. patent application Ser. No. 10/936,595 filed Sep. 9, 2004 now abandoned which claims priority from U.S. Provisional Patent Application No. 60/501,076 filed Sep. 9, 2003 entitled Sports Equipment Caddy.

FIELD OF THE INVENTION

This invention relates to a transportable storage device, and more particularly, it relates to a device for storing, transporting and dispensing sports equipment.

BACKGROUND OF THE INVENTION

For many coaches, transporting equipment to and from games for any sport that requires a multitude of protective gear and equipment may be fairly cumbersome and unwieldy. Baseball and softball are examples of sports that involve a plurality of equipment needed for proper team play. Typically, coaches haul one or more large canvas bags from their vehicle to the dug out for each game, and back from the dug out to their vehicle after each game. The equipment loosely packed into such canvas bags usually end up in a disorganized mess due to movement from transport and can be harmed when the equipment collides with each other. The bags may be very heavy and cumbersome to carry and they do not provide proper storage for the equipment as they do not provide ventilation to allow wet or sweaty equipment to dry out, thereby causing damage due to mold.

It is therefore desirable to provide an equipment carrier that keeps virtually all equipment required for a particular sport together such that the equipment may be easily transportable to and from games. In particular, it is desirable to provide a wheeled container for the equipment, preferably where the wheels on such a container are retractable between an extended position for use and a stowed position retracted flush within corresponding wheel-wells for ease and efficiency of storage.

In the prior art applicant is aware of U.S. Pat. Nos. 3,141,680 and 4,575,109 which issued, respectively, to McCord et al for Portable Luggage having Retractable Wheels, and to Cowdery for a Luggage Case with Retractable Wheels. McCord et al. disclose a piece of luggage and luggage carrier having a pair of retractable wheels and a telescoping handle with a mechanism operating on the handle for extending and retracting the wheels from and to a compartment within the luggage. Cowdery discloses a luggage case having a retractable handle and retractable wheels which includes a clothes bar for hanging clothes and other items as well as inner compartments, at least one of which is accessible without opening the luggage case. The case is made up of a top portion and a bottom portion which are pivotally connected to each other so that they have an open and a closed position. When in the closed position the top and bottom portions form a case having top and bottom walls, front and rear walls and a pair of side walls. The retractable handle and retractable wheels can be linked so that extension of the retracted handle causes extension of the retracted wheels.

The devices of McCord et al. and Cowdery may be well adapted for use as luggage for the transport of clothing and travel items over the typically smooth-paved or smooth-floored surfaces associated with an airport for example where it is advantageous and not a disadvantage to use the luggage handle as the wheel actuating mechanism also. In contradistinction, the wheeled sports container according to the present invention is better adapted for rolling over somewhat rougher terrain as may typically be encountered around many playing fields used for sports such as baseball, hockey etc. The rough terrain may be due to uneven ground between parking lots and the playing fields, and may include the parking lots themselves if gravel or mud lots, or may be due to snow and ice in an between parking lots and rinks, to give just two examples. In such instances it has been found that a heavy load of sporting goods in the container being bumped over uneven ground may inadvertently cause a handle-mounted wheel actuation linkage on the container to dis-engage the outwardly locked wheels thereby allowing the wheels to retract and the container to drop onto the ground.

SUMMARY OF THE INVENTION

In accordance with the present invention, the device includes a housing defining at least one compartment for storing equipment a pair of retractable wheels including, a first and a second retractable wheel mounted to a bottom end of the housing, and an actuator for displacing the first and the second retractable wheel between a recessed position and an extended position.

In an embodiment of the present invention, the housing defines a plurality of compartments for storing sports equipment such as baseball or softball equipment. The compartments may include a bat storage compartment, a ball storage compartment, a helmet storage compartment, a protective pad storage compartment, and a first aid storage compartment. Securing means are provided within each of the plurality of compartments to secure the equipment. A vent positioned on the housing allows circulation of air within the compartments to maintain the humidity within the housing. At least one hook is mounted on the housing so as to extend therefrom thereby allowing the housing to be hung on a support such as the mesh of a baseball back-stop. The first and second retractable wheels are advantageously of large diameter so as to support the device while providing mobility to transport the device over a variety of surfaces such as wet or rough or loose ground. The first and the second retractable wheels may be recessed when not in use and thus disposed within wheel receiving recesses or cavities or wells defined in the lower-most end of the housing. The first and second retractable wheels may extend from the wheel receiving recesses when required to be used.

An actuator, which is in operable communication with the first and the second retractable wheels displaces the first and the second retractable wheels between the recessed position and the extended position. The actuator is a foot actuated mechanical linkage consisting of a pedal lever driving a drive arm connected to a bell crank. Rotation of the pedal lever by downward foot pressure drives the drive arm and rotates the bell crank. The bell crank and wheel-supporting arms are mounted on a shaft. Rotation of the bell crank correspondingly rotates the wheel-supporting arms and thereby translates the corresponding wheels mounted thereon about the shaft between their extended and recessed positions.

In summary, the storage device for transporting equipment according to the present invention may be characterized as including a housing having opposite upper and lower ends and opposite first and second surfaces extending therebetween, and defining at least one compartment for storing the equipment and defining a separate pair of wheel wells. The housing has an opening into the compartment. A door selectively closes the opening. A handle is mounted to the upper end of the housing.

A pair of retractable wheels are mounted on a shaft extending through the wheel wells so that a first retractable is wheel mounted on a first side of the housing and a second retractable wheel is mounted on an opposite second side of the housing. The shaft extends through the housing from the first side to the second side. An actuator is mounted in the housing for displacing the retractable wheels between a retracted position within the wheel wells and an extended position at least partially cantilevered from the wheel wells and from the second surface, from the lower end of the housing. The actuator is only coupled with the lower end of the housing and not with the handle or any part of the mechanism for telescoping the handle if the handle is telescopically mounted to the housing. A latch releasably locks the actuator when the wheels are in the extended position so as to maintain the wheels in their extended position.

The actuator includes a foot pedal disposed in the second surface, in the lower end of the housing. The actuator cooperates with the shaft for rotation of the shaft upon movement of the foot pedal relative to the housing. The wheels are mounted on at least one arm mounted on the shaft for simultaneous rotation of the at least one arm upon the rotation of the shaft.

In a preferred embodiment the actuator is exclusively a foot pedal actuated mechanism only actuated by actuation of the foot pedal, where the mechanism is in operable communication via a mechanical linkage with the wheels such that the wheels are disposed within the wheel wells when the linkage is in a first position and such that the wheels extend outwards from the wheel wells when the linkage is in a second position.

The latch may include a manually operable lever cooperating with a receiver, the lever mounted in the second surface for selectively releasable registration of an end of the lever with the receiver. The receiver is mounted to the linkage wherein, with the end of the lever engaged in the receiver the linkage is locked statically relative to the housing and wherein when the lever is disengaged from the receiver the linkage is free to move relative to the housing. The receiver may be mounted on, for rotation with, the shaft, and may include a notched member.

Advantageously, the second surface is a rear surface and the first surface is a front surface of the housing.

In one embodiment the foot pedal is rotatably mounted in a foot well in the rear surface and is coupled to a rigid drive member so that rotation of the pedal translates the drive member causing the drive member to rotate a bell-crank mounted on the shaft. Rotation of the bell-crank causes the retractable wheels to extend into the extended position against the return biasing force of the spring.

In a further embodiment, at least one detachable hook is coupled with a wall of the housing opposite from the door for hanging the device on a support. Where a pair of such hooks are provided they are spaced apart, for example laterally or vertically, to provide stability. At least one vent may be provided, positioned on the housing to permit circulation of air within the housing. The at least one compartment may further include a plurality of securing means such as hooks, clips, ball-retaining tubes, bat racks, etc mounted within the compartment to releasably secure the equipment mounted within the compartment. The securing means is intended to be appropriate to the specific equipment to be secured within the compartment, and will vary from sport-to-sport or upon the use put to the device. For example, in the specific instance of the use of the device for baseball, bat-racks are convenient if mounted into a pair of clam-shell opening doors so as to symmetrically spread out the weight. The door may thus include a pair of hinged opposed doors and a latch means for securing the opposed doors together to releasably close the open front of the housing.

In a preferred embodiment, not intended to be limiting, the housing may be characterized as vertically elongated and defines therein a plurality of compartments for storing the sporting equipment. The housing has opposing horizontal top and bottom walls, opposing vertical side walls, and a vertical back wall opposing the front opening aperture in an open front of the housing.

BRIEF DESCRIPTION OF THE DRAWINGS

In the accompanying drawing figures like reference characters designate the same or similar parts throughout the several views, and wherein:

FIG. 5*a* is a plan view of the device shown in FIG. 3 depicting a top latch means to secure the door;

FIG. 5*b* is a front view of the device shown in FIG. 3 depicting a front latch means to secure the door;

DETAILED DESCRIPTION OF EMBODIMENTS OF THE INVENTION

Figure 1:
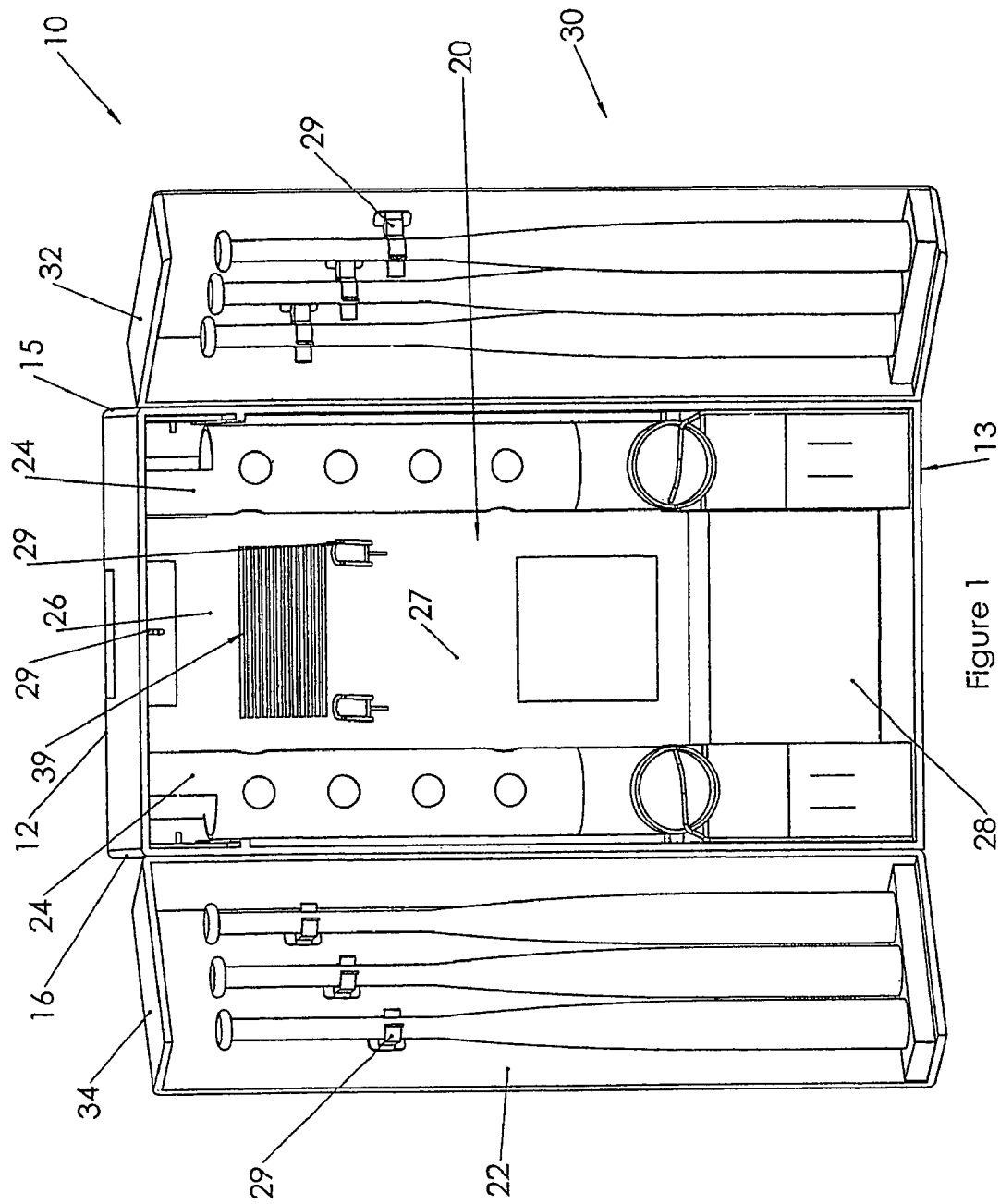
FIG. 1 is a front perspective view of an embodiment of the device according to the present invention.
Figure 2:
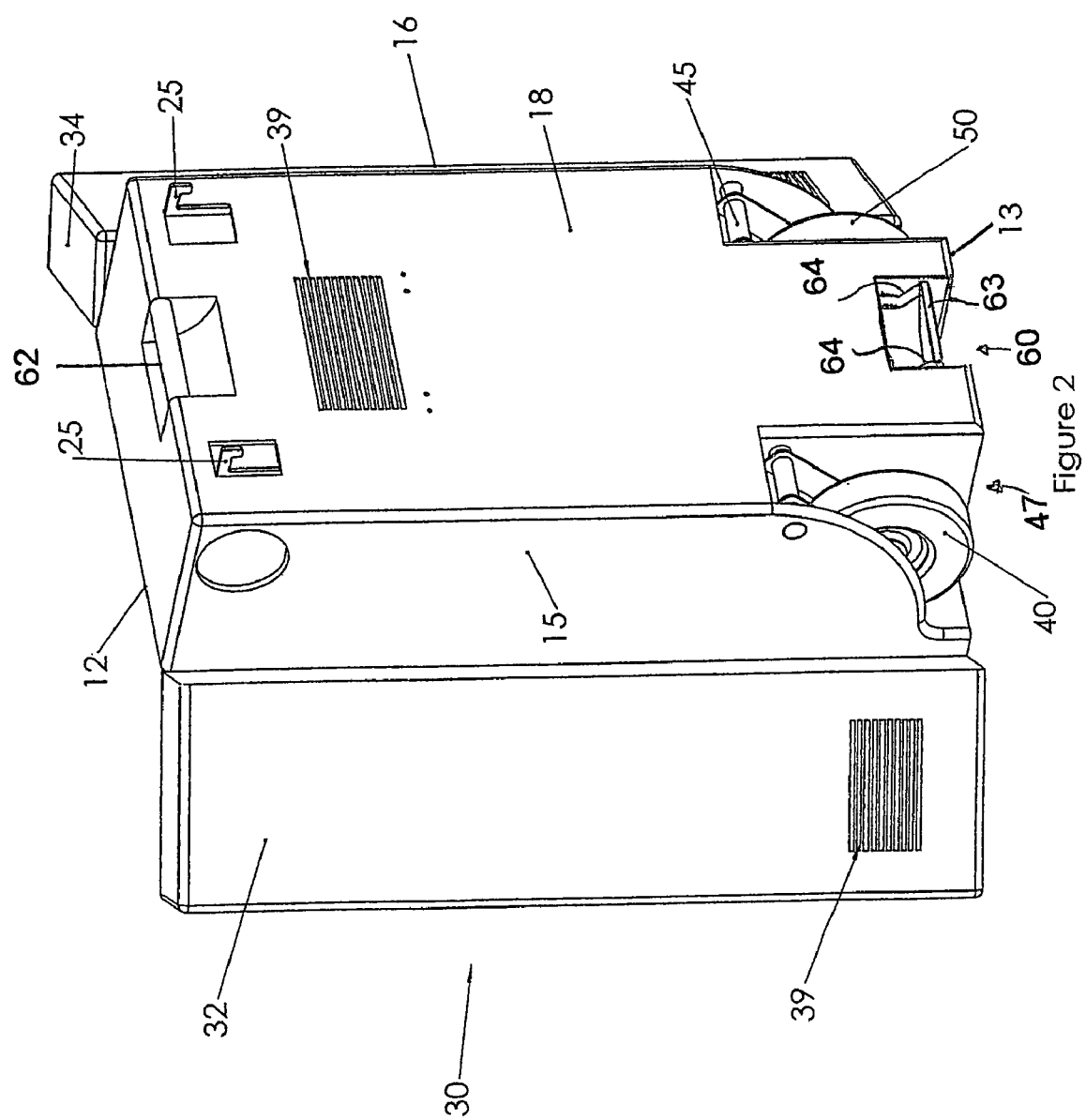
FIG. 2 is a rear perspective view of the device shown in FIG. 1.

With reference to FIGS. 1 to 8*b* wherein similar characters of reference denote corresponding parts in each view, the device according to the present invention includes a housing 10, compartment 20, a door 30, first and a second retractable wheels 40 and 50 respectively, and a wheel actuator 60.

Figure 6A:
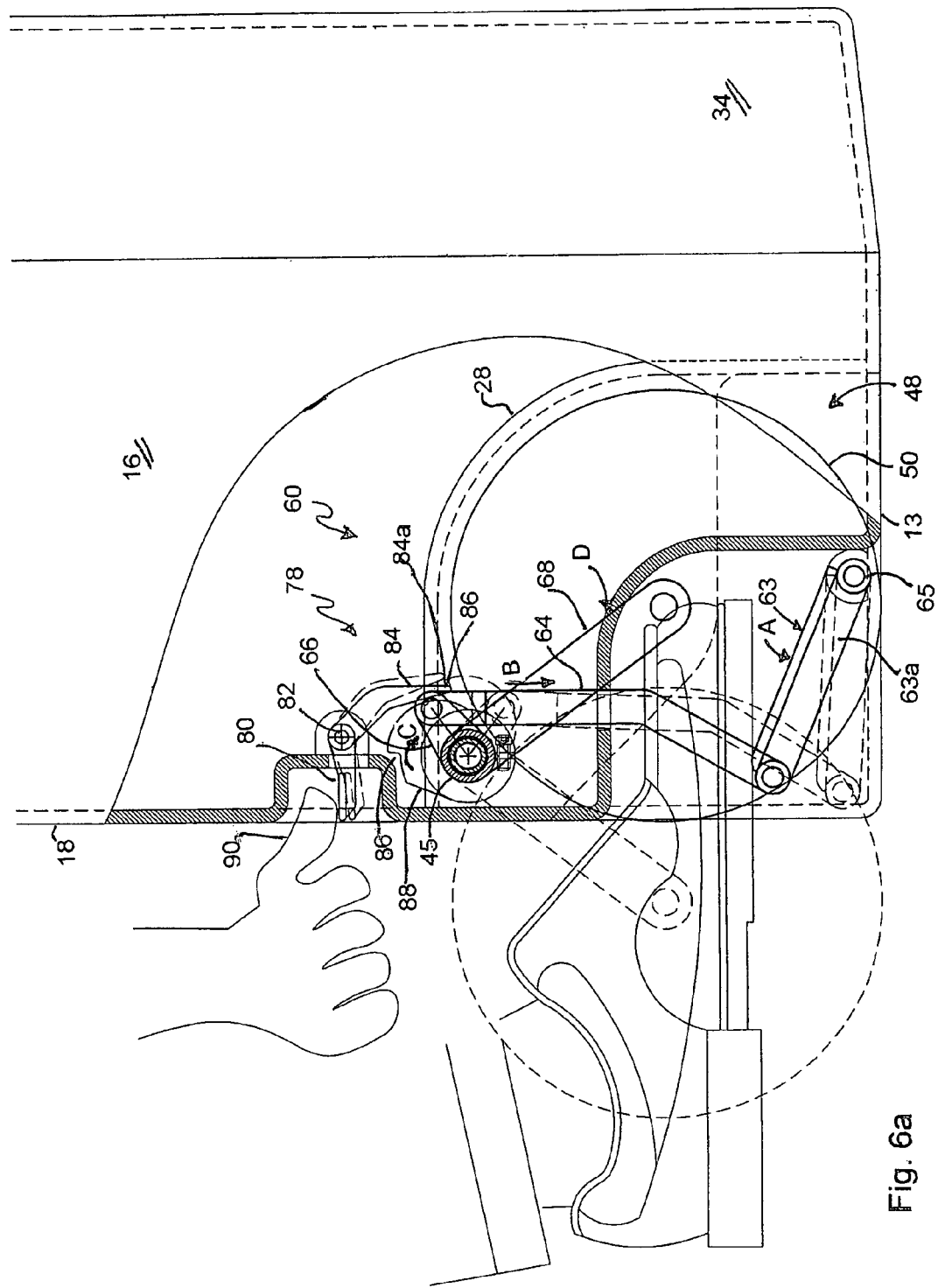
FIG. 6*a* is a partially cut away side elevation view of the device shown in FIG. 3 depicting a foot actuated mechanism in operable communication with a pair of retractable wheels.
Figure 6B:
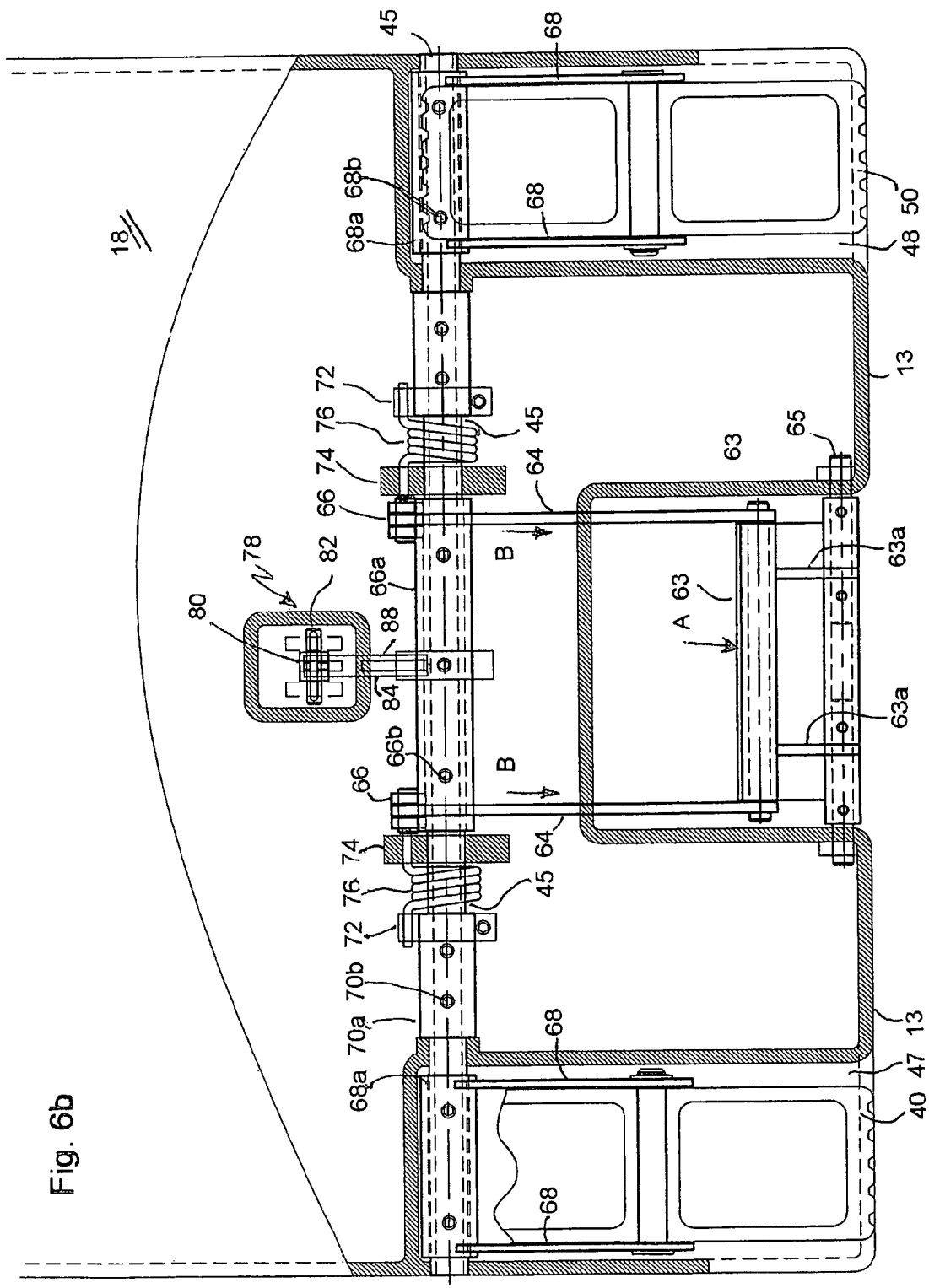
FIG. 6*b* is a rear view of the device shown in FIG. 6*a*.
Figure 6C:
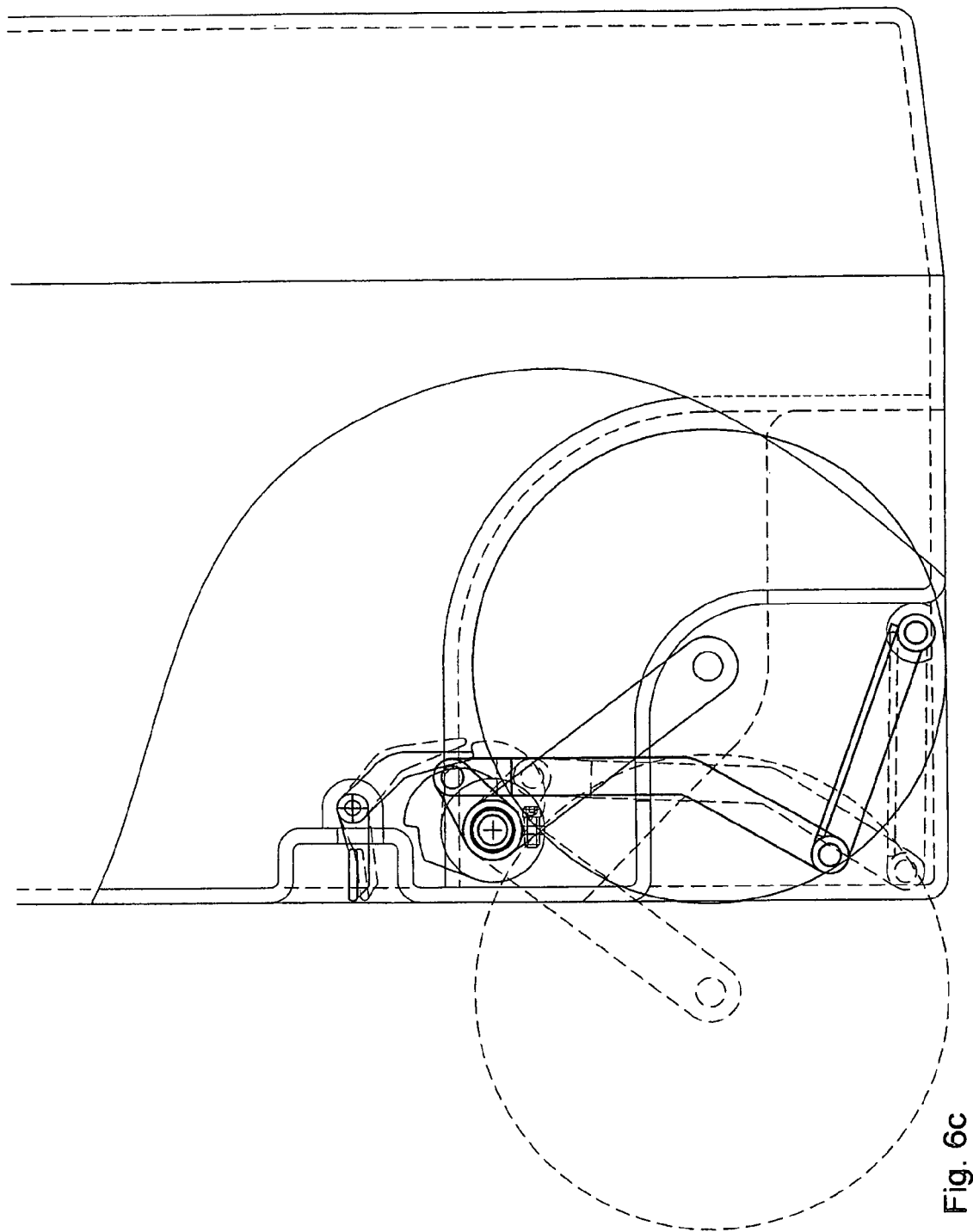
FIG. 6*c* is an alternative view of the device shown in FIG. 6*a*.

Housing 10 is typically a vertically elongated casing having opposing horizontal top and bottom walls 12, 13, opposing vertical side walls 15, 16, and a vertical back wall 18. Opposing door 30 closes the open front of housing 10. Door 30 may be single door but in one embodiment of the present invention, door 30 includes a pair of hinged opposed doors 32, 34 having securing means such as a latch, lock, or the like to releasably secure the doors 32, 34 closed together. Preferably securing means includes a front latch 35 and a top latch 37 to secure doors 32 and 34 together, as seen in FIGS. 6*a* and 6*b* although any securing means known in the art such as locks may be used. When doors 32 and 34 are closed and secured by front latch 35 and top latch 37, housing 10 is preferably sized to fit into bed of a pickup truck or an automobile trunk so that the device may be conveniently transported. Housing 10 may be made of a rigid lightweight and durable material. Without intending to be limiting this may include plastic, or the housing may be made of a durable nylon exterior shell wrapped around a lightweight and strong frame construction.

Figure 3:
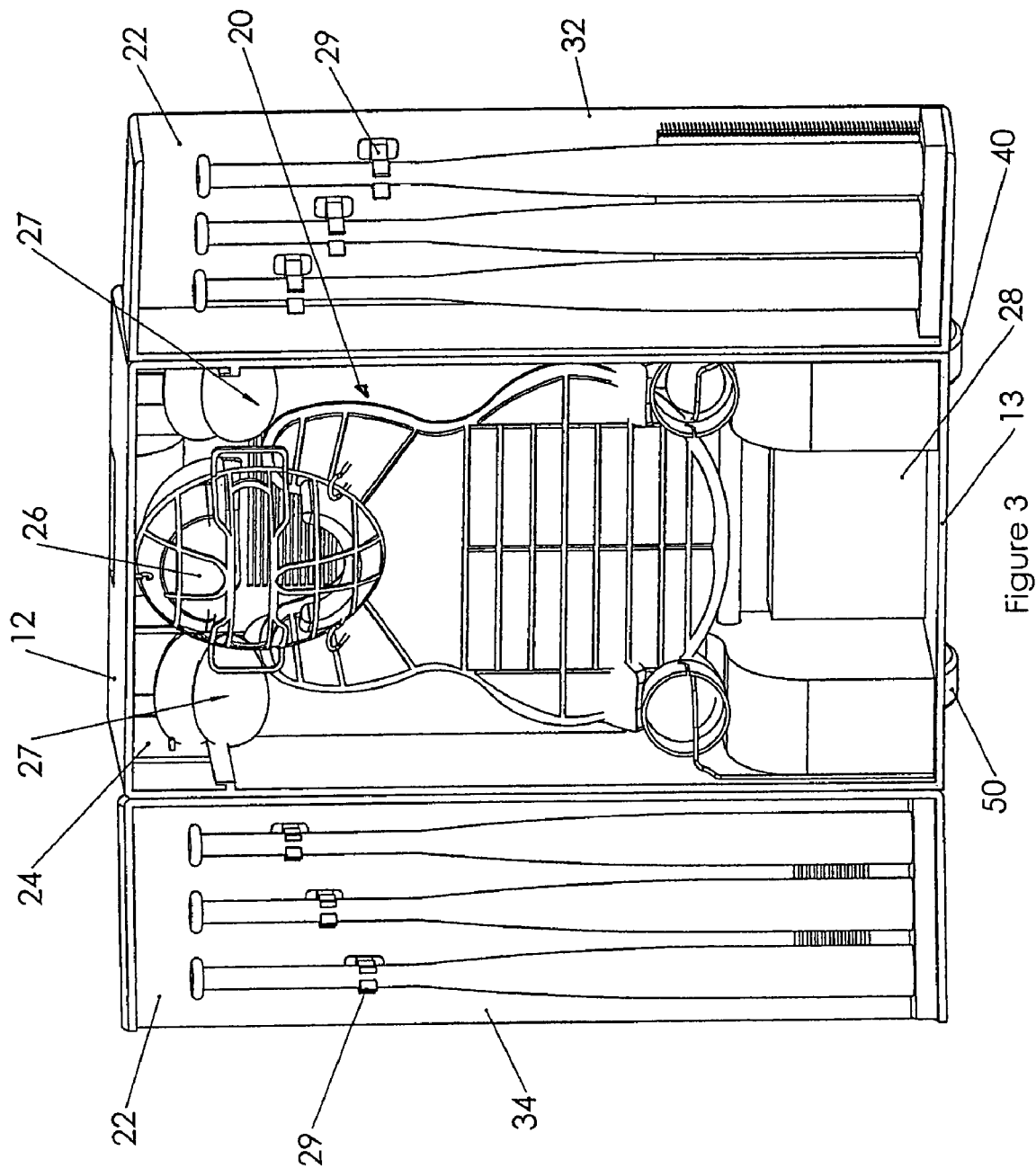
FIG. 3 is a front perspective view of the device shown in FIG. 1 depicting storage of the baseball equipment.
Figure 4:
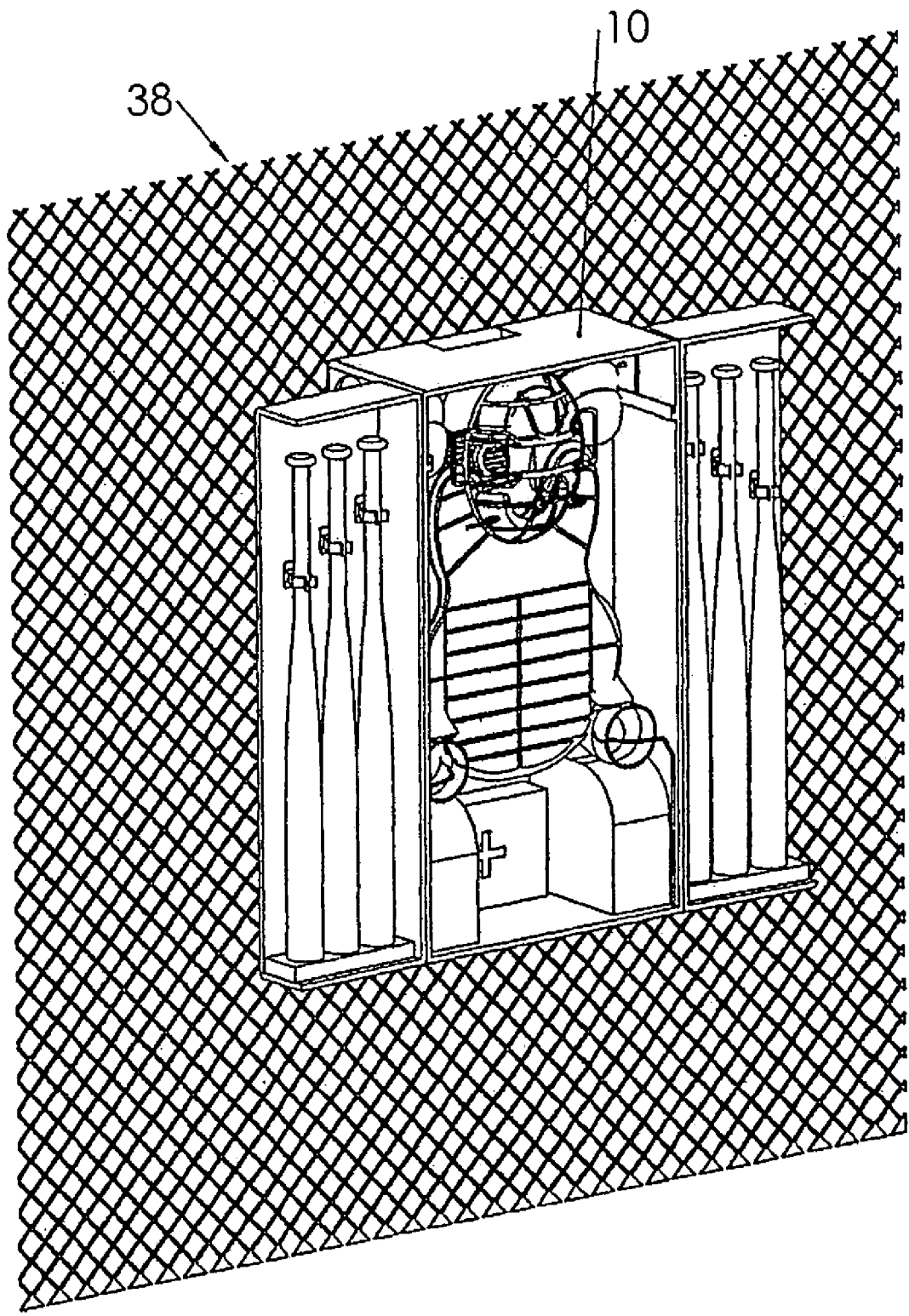
FIG. 4 is a front perspective view of the device shown in FIG. 3 hanging on a chain link fence.

Housing 10 defines at least one compartment 20 which is configured to store a plurality of equipment. In an embodiment of the invention, housing 10 defines a plurality of compartments 20 configured to store baseball or softball equipment. As seen in FIGS. 1, 3, and 4, storage compartments 20 may include a bat storage 22 having means to secure a plurality of bats, a ball storage 24 having means to secure a plurality of balls, a helmet 26 storage having means to secure a plurality of helmets, a protective pad storage 27 having means to secure a plurality of protective pads, and a first aid storage 28 having means to secure a first aid kit. In one embodiment of the present invention, bat storage 22 may store up to six bats, helmet storage 26 may store at least one helmet having a conventional protective mask such as used by a back-catcher, protective pad storage 27 may store up to two belly pads and two sets of shin pads, and first aid storage 28 may store a Level 3 First Aid Kit. Securing means 29 for each of the storage compartments include conventional securing means such as releasable fasteners to secure the bats, and hooks and clips to hang and secure the protective pads.

In one embodiment of the present invention, doors 32, 34 are used for bat storage 22. Ball storage 24 may include first and second ball tubes each having an upper inlet to receive a plurality of balls and a lower outlet for dispensing the balls. A retaining means such as a flap prevents the balls from exiting the tube until needed. Housing 10 may further define additional compartments 20 to store additional equipment and miscellaneous items such as for example baseball gloves, score books, lineup board, towels, tools, and a tape measure.

Detachable hooks 25 may be mounted on any surface of housing 10 such that housing 10 may be hung on a support. In an embodiment of the present invention, hooks 25 may be attachable to vertical back wall 18 to enable a user to hang the housing onto a chain link fence 38 as found at or near the dugout on most baseball or softball playing fields. As illustrated in FIGS. 5a and 5b, when the device is hung on a chain link fence, the front surfaces of doors 32 and 34 and vertical back wall 18 are all visible through the fence from the side of the fence opposite to the housing, and may be used for displaying team logos, sponsor advertising or other similar graphics.

Vents 39 to allow circulation of air through housing 10 may be provided at various locations on housing 10. By allowing adequate air flow through housing 10, the humidity within housing 10 may be balanced thereby preventing elemental damage to the equipment inside for example mildew due to un-vented moisture. In an embodiment of the present invention, vents 39 are provided on doors 32 and 34 and on vertical back wall 18.

First and second retractable wheels 40, 50 are preferably large diameter wheels such as 6 or 8 or 10 inch diameter wheels that are capable of supporting the weight of housing 10 and the equipment disposed within housing 10 while enabling manual transport of the device on a variety of surfaces, including uneven surfaces such as playing fields, rocky or sandy terrain, or curbs and stairs. Large diameter wheels provide superior mobility and ease of operation over uneven surfaces.

First and second retractable wheels 40, 50 are mounted on corresponding first and a second ends of a shaft 45. Shaft 45 extends horizontally and laterally through a bottom or lower end of housing 10 such that the first and second retractable wheels are positioned at the bottom of housing 10 on laterally oppositely disposed first and second sides of the housing. The bottom end of housing 10 defines wheel wells or receiving recesses 47, 48 wherein first and second retractable wheels 40, 50 may respectively be recessed and wholly disposed within. When first and second retractable wheels 40, 50 are in their retracted position, the housing is easier to handle and less bulky to store in an automobile trunk, pickup truck bed or other storage location. When first and second retractable wheels 40, 50 are in their extended position, the housing may be transported by the user grasping and pulling on handle 62 to tip the housing from resting on its base onto its wheels and to roll the housing on its wheels while the housing is inclined from the vertical so that most of the weight of the housing and contents are borne by the wheels.

The wheel actuator 60 is a foot operated mechanism mounted in the lower end of the housing, which causes first and second retractable wheels 40, 50 to extend outwards from their wheel receiving recesses and retract into their wheel receiving recesses. In the illustrated embodiment of the present invention, actuator 60 includes a manually operated foot pedal 63 as its prime mover. When foot pedal 63 is on its cross-arms 63a pivoted about pin 65 downwardly in direction A from its raised position by a downwards foot pressure, drive arms 64 are driven downwardly in direction B causing rotation of bell-crank arm 66 in direction C. Bell-crank arm 66 and wheel supporting arms 68 are rigidly mounted to shaft 45 so that rotation of the bell-crank arm also rotates wheel supporting arms 68. Rotation of crank arm 66 causes arms 68 to rotate in direction D thereby extending wheels 40 and 50, mounted on on the distal ends thereof, from their wheel receiving recesses into their fully extended positions shown in dotted outline in FIG. 6a.

As seen in FIG. 6b, arms 68 may be rigidly mounted to shaft 45 by means of arms 68 being mounted to collars 68a, themselves rigidly affixed to the shaft by, for example, bolts 68b. Similarly, bell crank arms 66 may be rigidly mounted to shaft 45 by being rigidly mounted to collar 66a, collar 66a rigidly mounted to shaft 45 by bolts 66b. Collars 70a, rigidly mounted to shaft 45 by bolts 70b, have annular flanges 72 rigidly mounted thereto.

Flanges 74 are rigidly mounted to, and protrude inwardly from, back wall 18. Shaft 45 is rotatably journalled through flanges 74. A pair of helical springs 76 are mounted at their ends to, so as to extend between, flanges 72 and 74, and disposed on opposite sides of arms 64. Consequently, rotation of shaft 45 resiliently deforms springs 76 which are arranged to urge wheels 40, 50 into their retracted positions. That is, pivoting of pedal 63 downwardly so as to rotate bell cranks 66 and thus shaft 45, to thereby extend the wheels from the wheel wells, is rotation against the resilient return biasing force of the springs.

The wheels 40, 50 may be releasably locked in their extended position against the return biasing force of springs 76 using a manually operated latch mechanism 78. In particular a thumb-lever 80 pivots about pin 82 so as to rotate a latch arm 84 into and out-of locking engagement in a notch 86 formed in a cam 88. Cam 88 is rigidly mounted on shaft 45 so that rotation of shaft 45 as bell crank 66 is rotated in direction C rotates notch 86 into engagement with the distal end 84a of latch arm 84. Latch arm 84 is resiliently biased by a spring (not shown) mounted in the latching mechanism so as to drive distal end 84a into notch 86 as cam 88 is rotated sufficiently, and corresponding at that point to the full extension of the wheels from the wheel wells. Thus the thumb 90 of a user pressing downwardly on lever 80 releases the distal end 84a of latch arm 84 from engagement with cam 88 against the force of the spring, thereby allowing free rotation of the cam 88 and shaft 45 so that the wheels may retract into the wheel wells.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A storage device for transporting equipment, the device comprising:
   a housing having opposite upper and lower ends and opposite first and second surfaces extending therebetween, and defining at least one compartment for storing the equipment and defining a separate pair of wheel wells, said housing having an opening into said at least one compartment, a door for selectively closing said opening, and a handle mounted to said upper end of said housing;
   a first and a second retractable wheel mounted on a shaft, said first retractable wheel mounted on a first side of said housing and said second retractable wheel mounted on an opposite second side of said housing, said shaft extending through said housing from said first side to said second side; and
   an actuator for displacing said first and said second retractable wheels between a refracted position within said wheel wells and an extended position at least partially cantilevered from said second surface, from said lower end of said housing, said actuator only coupled with said lower end of said housing;
   a latch for releasably locking said actuator when said wheels are in said extended position so as to maintain said wheels in said extended position,
   wherein said actuator includes a foot pedal disposed in said second surface, in said lower end of said housing and cooperating with said shaft for rotation of said shaft upon movement of said foot pedal relative to said housing, and wherein said wheels are mounted on at least one arm mounted on said shaft for simultaneous rotation of said at least one arm upon said rotation of said shaft,
   wherein said actuator is exclusively a foot pedal actuated mechanism only actuated by actuation of said foot pedal, said mechanism in operable communication via a mechanical linkage with said wheels such that said wheels are disposed within said wheel wells when said linkage is in a first position and such that said wheels extend outwards from said wheel wells when said linkage is in a second position,
   wherein said latch includes a manually operable lever cooperating with a receiver, said lever mounted in said second surface for selectively releasable registration of an end of said lever with said receiver, said receiver mounted to said linkage wherein, with said end of said lever engaged in said receiver said linkage is locked statically relative to said housing and wherein when said lever is dis-engaged from said receiver said linkage is free to move relative to said housing,
   wherein said receiver is mounted on, for rotation with, said shaft,
   wherein said receiver includes a notched cam member,
   wherein said second surface is a rear surface and said first surface is a front surface,
   wherein said foot pedal is rotatably mounted in said rear surface and is coupled to a rigid drive member so that rotation of said pedal translates said drive member causing said drive member to rotate a bell-crank mounted on said shaft, said rotation of said bell-crank causing said retractable wheels to extend into said extended position against the return biasing force of said spring.

* * * * *